(12) United States Patent
Gushwa

(10) Patent No.: US 8,814,072 B2
(45) Date of Patent: Aug. 26, 2014

(54) USER-CONTROLLED ADJUSTMENT MECHANISM FOR A FOOD PROCESSING DEVICE

(75) Inventor: David Joseph Gushwa, Mishawaka, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 450 days.

(21) Appl. No.: 13/307,385

(22) Filed: Nov. 30, 2011

(65) Prior Publication Data

US 2013/0134246 A1    May 30, 2013

(51) Int. Cl.
*A47J 43/046* (2006.01)

(52) U.S. Cl.
USPC .............................. 241/36; 241/37.5; 241/92

(58) Field of Classification Search
CPC ............................... A47J 43/046; B02C 25/00
USPC ........................ 241/36, 37.5, 92, 100; 99/537
See application file for complete search history.

(56) References Cited

U.S. PATENT DOCUMENTS

| | | |
|---|---|---|
| 2,480,717 A | 8/1949 | Dodegge |
| 3,704,736 A | 12/1972 | Pratley |
| 4,283,979 A | 8/1981 | Rakocy |
| 4,364,525 A | 12/1982 | McClean |
| 4,369,680 A | 1/1983 | Williams |
| 4,570,519 A | 2/1986 | Motosko |
| 4,624,166 A | 11/1986 | Kreth |
| 4,688,478 A | 8/1987 | Williams |
| 4,733,589 A | 3/1988 | Wolff |
| 4,998,677 A | 3/1991 | Gallaher |
| 5,197,681 A | 3/1993 | Liebermann |
| 5,577,430 A | 11/1996 | Gunderson |
| 7,681,817 B2 | 3/2010 | Orent |
| 7,694,615 B2 | 4/2010 | DiPietro |
| 8,671,832 B2 * | 3/2014 | Beber et al. ..................... 99/462 |
| 2006/0075872 A1 | 4/2006 | Wangler |
| 2006/0150791 A1 | 7/2006 | Chase |
| 2007/0044621 A1 | 3/2007 | Rote |
| 2007/0095959 A1 | 5/2007 | Narai et al. |
| 2007/0261523 A1 | 11/2007 | Hussey |
| 2008/0156913 A1 | 7/2008 | Orent |
| 2008/0163768 A1 | 7/2008 | Glucksman |

(Continued)

FOREIGN PATENT DOCUMENTS

| | | |
|---|---|---|
| EP | 0244016 A1 | 11/1987 |
| EP | 2130471 A1 | 12/2009 |

(Continued)

OTHER PUBLICATIONS

European Patent Application No. 12192818.8 filed Nov. 15, 2012, Applicant: Whirlpool Corporation, European Extended Search Report, re: Same, Mail Date: Oct. 9, 2013.

(Continued)

*Primary Examiner* — Mark Rosenbaum

(57) ABSTRACT

A food processor includes a base and a bowl with a removable lid. Food items are advanced into the bowl through a feed tube formed in the lid where they are cut by a cutting assembly driven by a motor. The cutting assembly is adjustable to vary the thickness of the cut food items. The food processor includes an adjustment assembly that is operable to adjust the cutting thickness of the cutting assembly while the cutting assembly is driven by the motor.

20 Claims, 5 Drawing Sheets

(56) References Cited

U.S. PATENT DOCUMENTS

| | | |
|---|---|---|
| 2009/0301319 A1 | 12/2009 | Bigge |
| 2009/0314168 A1 | 12/2009 | Krasznal |
| 2011/0139017 A1 | 6/2011 | Beber |

FOREIGN PATENT DOCUMENTS

| | | |
|---|---|---|
| FR | 2582497 A1 | 12/1986 |
| FR | 2602660 A1 | 2/1988 |
| JP | 01299522 | 4/1989 |
| JP | 01153123 | 6/1989 |
| JP | 04099551 | 3/1992 |
| JP | 04099552 | 3/1992 |
| WO | 0159153 A3 | 8/2001 |
| WO | 2009076585 A1 | 6/2009 |

OTHER PUBLICATIONS

European Patent Application No. 12192827.9 filed Nov. 15, 2012, Applicant: Whirlpool Corporation, European Search report re: same with a mail date Jul. 17, 2013.

"Home Cooking in Montana", Product Review . . . Cuisinart Elite 12 Cup Food Processor Model FP-12DC; http://homecookinginmontana.blogspot.com/2010/03/product-reviewcuisinart-elite-12-cup.html.

European Patent Application No. 12192821.2 filed Nov. 15, 2012, Applicant: Whirlpool Corporation, European Extended Search Report, re: Same, Mail Date: Oct. 8, 2013.

\* cited by examiner # USER-CONTROLLED ADJUSTMENT MECHANISM FOR A FOOD PROCESSING DEVICE

CROSS-REFERENCE TO RELATED U.S. PATENT APPLICATIONS

Cross-reference is made to co-pending U.S. Utility patent application Ser. No. 13/307,305 entitled "FOOD PROCESSING DEVICE WITH A LID MOUNTED ADJUSTMENT MECHANISM," which was filed concurrently herewith (SUB-01578-US-NP), and U.S. Utility patent application Ser. No. 13/307,496 entitled "EXTERNALLY-OPERATED ADJUSTMENT MECHANISM FOR A FOOD PROCESSING DEVICE," which was filed concurrently herewith (PAT-00057-US-NP), each of which is assigned to the same assignee as the present application and each of which is hereby incorporated by reference.

TECHNICAL FIELD

The present disclosure relates generally to a domestic food processing device, and, more particularly, to a food processing device having a control for adjusting the cutting thickness of the food processing device.

BACKGROUND

A food processing device is a motorized domestic appliance for manipulating (e.g., chopping, slicing, dicing, shredding, grating, or blending) food items. Such an appliance includes a bowl with a removable lid. Food items are inserted into the bowl through a feed tube formed in the lid where they are cut by motor-driven cutting tool and collected in the bottom of the bowl. Some food processors also include an outlet on the bowl that guides the processed food items into an outside bin, container, or other bowl.

Food processors typically come equipped with a number of interchangeable cutting tools for slicing, shredding, or other food processing operations. One common cutting tool is a rotating disk-type cutter. Such a cutting tool includes a rotating disk and a cutting blade that are driven by the motor. The cutting blade is secured to the rotating disk at a location adjacent to an aperture formed in the disk so that processed food items cut by the blade fall through the aperture.

SUMMARY

According to one aspect of the disclosure, a food processor includes a base having a motor positioned therein, a bowl removably coupled to the base, and a lid removably coupled to the bowl. The bowl has a processing chamber defined therein, and the lid has a feed tube that opens into the processing chamber when the lid is secured to the bowl. The food processor also includes a cutting assembly that is positioned in the processing chamber and driven by the motor to cut food items advanced through the feed tube. The cutting assembly is positionable between a plurality of cutting positions to produce cut food items of varying thicknesses. The food processor includes an adjustment assembly that has electronically-controlled actuator coupled to the lid that is operable to move the cutting assembly between the plurality of cutting positions, and an electronic controller electrically coupled to the actuator. The controller includes a processor and a memory device electrically coupled to the processor. The memory device has stored therein a plurality of instructions which, when executed by the processor, cause the processor to operate the actuator to move the cutting assembly between the plurality of cutting positions while the cutting assembly is driven by the motor.

In some embodiments, the motor positioned in the base may be a first motor, and the actuator may include a body configured to move upwardly and downwardly relative to the lid to move the cutting assembly between cutting positions. The actuator may also include a second motor electrically coupled to the electronic controller and an output shaft connecting the body to the second motor.

Additionally, in some embodiments, the cutting assembly may include a cutting blade and a rotating disk coupled to the actuator. The rotating disk may be upwardly and downwardly moveable relative to the cutting blade to produce food items of varying thicknesses. In some embodiments, the actuator may further include a bearing positioned between the body and the rotating disk. The bearing may be configured to permit the rotating disk to rotate relative to the body of the actuator.

In some embodiments, the cutting assembly may further include a spring positioned between the cutting blade and the rotating disk. The spring may bias the rotating disk in a first cutting position to produce a food item having a first thickness, and movement of the body of the actuator in a first direction may cause the rotating disk to move relative to the cutting blade from the first cutting position to a second cutting position to produce a food item having a second thickness different from the first thickness.

In some embodiments, the body of the actuator may be internally-threaded and the output shaft of the second motor may be externally-threaded and is received in the body of the actuator. Rotation of the output shaft in a first direction may cause the body and the rotating disk to advance downward and rotation of the output shaft in a second direction may cause the body and the rotating disk to move upward.

Additionally, in some embodiments, the food processor may include a removable cap coupled to the lid. The cap may include a plurality of inner walls that define a socket sized to receive the body of the actuator, and the inner walls may be configured to engage the body to prevent rotation of the body.

In some embodiments, the food processor may include a sensor electrically coupled to the electronic controller. The sensor may be operable to detect whether the lid coupled to the bowl and generate an electrical output signal indicative thereof. The memory device may have stored therein a plurality of instructions which, when executed by the processor may cause the processor to communicate with the sensor to determine whether the lid coupled to the bowl, and deenergize the motor when the lid is removed from the bowl.

In some embodiments, the memory device may have stored therein a plurality of instructions which, when executed by the processor may cause the processor to energize the motor to drive the cutting assembly at a first rotational speed, and operate the actuator move the cutting assembly to a first cutting position corresponding to the first rotational speed.

According to another aspect, a food processor includes a base, a bowl removably coupled to the base that has a processing chamber defined therein, and a lid removably coupled to the bowl. The lid has a feed tube that opens into the processing chamber when the lid is secured to the bowl. The food processor also includes a cutting assembly positioned in the processing chamber. The cutting assembly is configured to cut food items advanced through the feed tube and is positionable between a plurality of cutting positions to produce cut food items of varying thicknesses. The food processor includes a motor positioned in the base, and the motor is configured to rotate the cutting assembly at a plurality of rotational speeds. The food processor further includes an adjustment assembly configured to move the cutting assembly between the plurality of cutting positions based on the rotational speed of the cutting assembly.

In some embodiments, the cutting assembly may include a cutting blade and a rotating disk coupled to the actuator. The rotating disk may be upwardly and downwardly moveable relative to the cutting blade to produce food items of varying thicknesses. Additionally, in some embodiments, the adjustment assembly may include a lever arm that is pivotally coupled to the rotating disk, and a mass that is coupled to a lower end of the lever arm. When the rotational speed is increased from a first rotational speed to a second rotational speed, the lower end of the lever arm is configured to pivot upward to move the rotating disk relative to the cutting blade.

Additionally, in some embodiments, the cutting assembly may further include a spring that may bias the lever arm in a first position such that when the cutting assembly is rotated at a first rotational speed, the lever arm is maintained in the first position and a first distance is defined between the cutting blade and the rotating disk. In some embodiments, when the cutting assembly is rotated at the second rotational speed, the lever arm may be in a second position and a second distance may be defined between the cutting blade and the rotating disk. The second distance may be less than the first distance.

In some embodiments, the first rotational speed may be in a range of 500 to 700 revolutions per minute. Additionally, in some embodiments, the first distance may be in a range of 5 to 6 millimeters.

In some embodiments, the second rotational speed may be greater than or equal to 1750 revolutions per minute. In some embodiments, the second distance may be approximately 2 millimeters.

Additionally, in some embodiments, the cutting assembly may further include a spring that may bias the lever arm in a first position such that when the cutting assembly is rotated at a first rotational speed, the lever arm is maintained in the first position and a first distance is defined between the cutting blade and the rotating disk. In some embodiments, when the cutting assembly is rotated at the second rotational speed, the lever arm may be in a second position and a second distance may be defined between the cutting blade and the rotating disk. The second distance may be greater than the first distance.

In some embodiments, the adjustment assembly may include an electronically-controlled actuator operable to move the cutting assembly between the plurality of cutting positions, and an electronic controller electrically coupled to the actuator. The controller may include a processor, and a memory device electrically coupled to the processor. The memory device may have stored therein a plurality of instructions which, when executed by the processor, cause the processor to operate the actuator to move the cutting assembly between the plurality of cutting positions based on the rotational speed of the cutting assembly.

According to another aspect, a food processor includes a base, a bowl removably coupled to the base that has a processing chamber defined therein, and a lid removably coupled to the bowl. The lid has a feed tube that opens into the processing chamber when the lid is secured to the bowl. The food processor also includes a cutting assembly positioned in the processing chamber and configured to cut food items advanced through the feed tube. The cutting assembly includes a cutting blade and a rotating disk that is upwardly and downwardly moveable relative to the cutting blade between a plurality of cutting positions to produce food items of varying thicknesses. The food processor includes a motor positioned in the base that is configured to rotate the cutting assembly at a plurality of rotational speeds, and an adjustment assembly. The adjustment assembly includes a centrifugal actuator pivotally coupled to the rotating disk. The centrifugal actuator is configured to move the rotating disk between the plurality of cutting positions based on the rotational speed of the cutting assembly.

BRIEF DESCRIPTION OF THE DRAWINGS

The detailed description particularly refers to the following figures, in which.

DETAILED DESCRIPTION OF THE DRAWINGS

Figure 1:
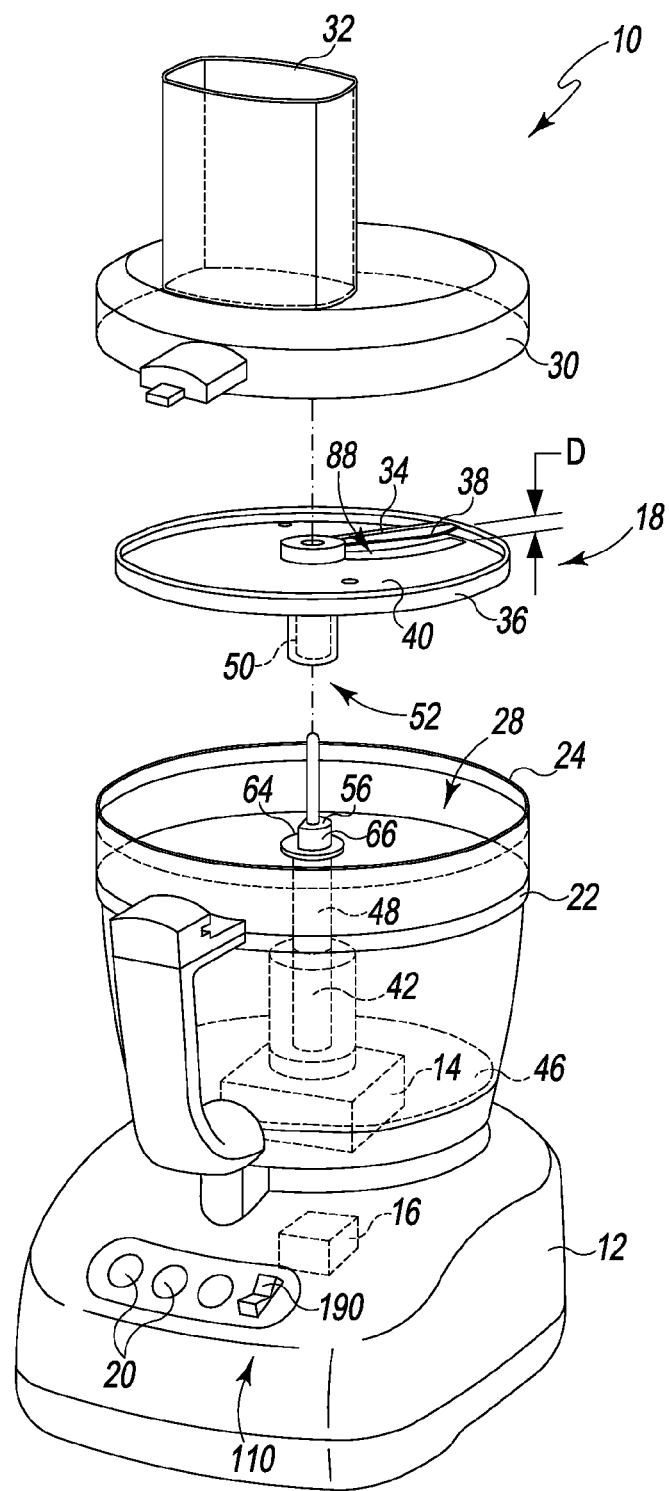
FIG. 1 is an exploded, perspective view of one embodiment of a food processor.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, a food processing device or food processor 10 is shown. The food processor 10 has a base 12 that houses a drive motor 14 and an electronic control unit (ECU) or "electronic controller" 16 electrically coupled to the drive motor 14. Under the control of the electronic controller 16, the motor 14 drives a cutting assembly 18 to cut food items such as cheeses, meats, fruits, and vegetables, as described in greater detail below. As described in greater detail below, the motor 14 is operable to drive the cutting assembly 18 at a number of different rotational or cutting speeds.

The base 12 also includes a number of control buttons 20 that are electrically coupled to the electronic controller 16. A user operates the control buttons 20 to control the operation of the motor 14 and hence the food processor 10. For example, one of the controls 20 may be operable to turn the motor 14 on and off while another control 20 may change the motor's speed. Each of the control buttons 20 is coupled to a control switch (not shown) operable to generate an electrical output signal when the user presses the corresponding button 20. In other embodiments, the user interface may include physical switches, touch sensors, knobs, or other appropriate user input devices to enable the user to control the operation of the food processor 10.

A removable receptacle or bowl 22 is secured to the base 12. The bowl's handle facilitates placement of the bowl 22 on the base 12. The bowl 22 has an upper rim 24 and an inner wall 26 that extends downwardly from the upper rim 24 to define a processing chamber 28 where food items may be processed by the cutting assembly 18.

The food processor 10 also includes a removable lid 30 that is configured to be secured to the rim 24 of the bowl 22. In that way, the removable lid 30 encloses the processing chamber 28. The lid 30 has a feed tube 32 formed thereon through which food items such as fruits and vegetables may be inserted into the bowl 22 to be processed by the food processor 10.

The bowl 22, lid 30, and feed tube 32 are generally made of a transparent or translucent plastic material so that the contents of the food processor 10 can be viewed by a user without removing the lid 30 from the bowl 22. Moreover, one or more locking mechanisms may be used to lock the bowl to the base 12 and the lid 30 to the bowl 22.

As shown in FIG. 1, the cutting assembly 18 includes a cutting blade 34 and a rotating disk 36. A vertical distance, D, between the cutting edge 38 of the cutting blade 34 and the upper surface 40 of the rotating disk 36 defines a cutting thickness of food items processed by the cutting assembly 18. In other words, the thickness of the processed food items cut by the food processor 10 is determined by the distance D between the cutting edge 38 of the cutting blade 34 and the upper surface 40 of the rotating disk 36. As the distance D between the cutting edge 38 of the cutting blade 34 and the upper surface 40 of the rotating disk 36 increases, thicker pieces of food items may be created; thinner pieces of food items may be created when the distance D between the cutting edge 38 of the cutting blade 34 and the upper surface 40 of the rotating disk 36 decreases. The position of the rotating disk 36 relative to the cutting blade 34 may be controlled by a thickness adjustment assembly 106, as described in greater detail below.

Figure 2:
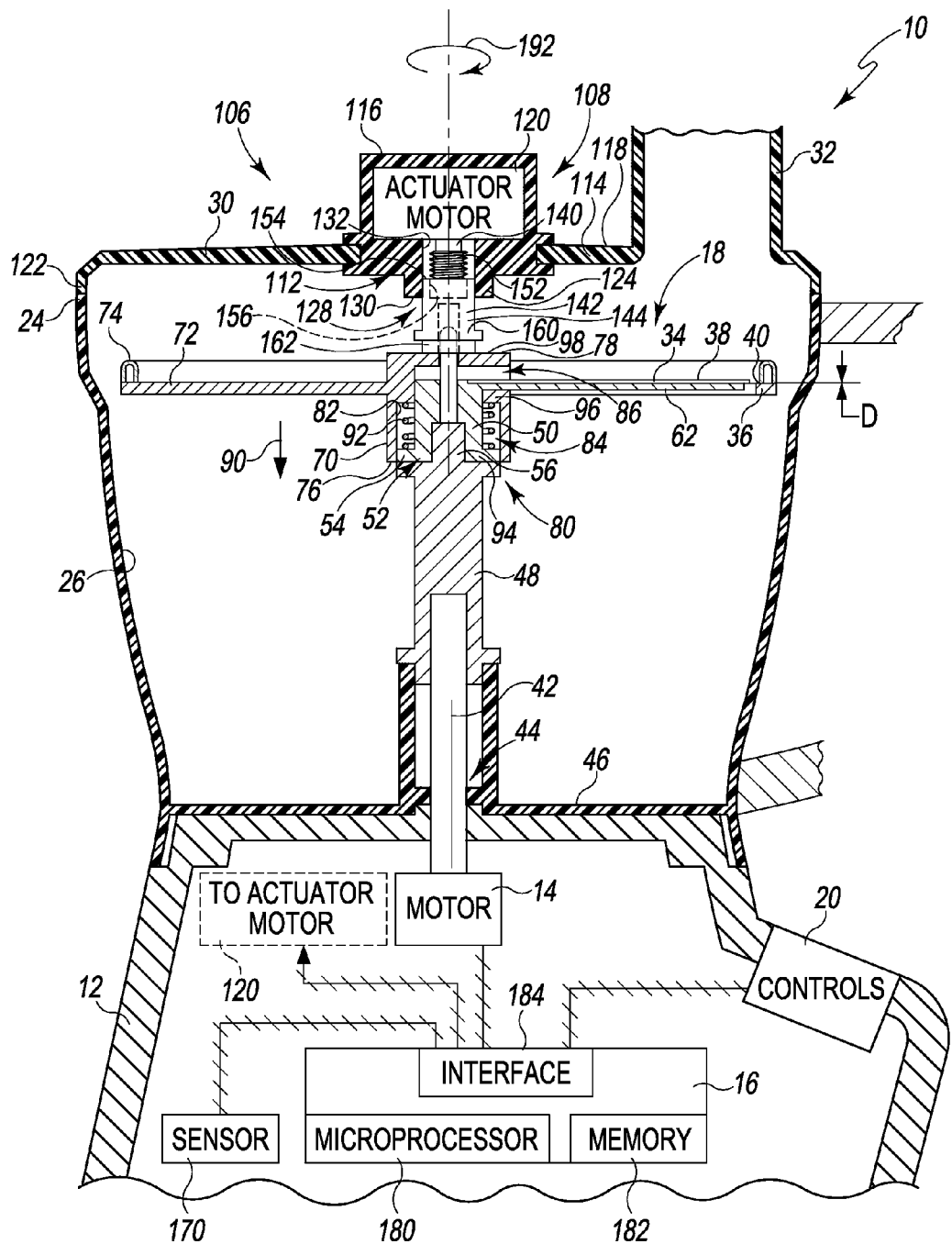
FIG. 2 is a partial cross-sectional side elevation view of the food processor of FIG. 1 showing a cutting assembly in one cutting position.

The motor 14 includes an output shaft 42 extending upwardly from the base 12 through an opening 44 defined in the bottom wall 46 of the bowl 22. The output shaft 42 is coupled to a removable drive stem 48 within the processing chamber 28. The removable drive stem 48 is configured to be coupled to a central shaft 50 of the cutting assembly 18 such that the cutting assembly 18 may be driven by the motor 14. As shown in FIGS. 1 and 2, the central shaft 50 has a plurality of inner walls that define a socket 52 in a lower end 54 thereof, and the drive stem 48 has an upper end 56 that is keyed to substantially match the configuration of the socket 52. In the illustrative embodiment, the upper end 56 of the drive stem 48 is "D-shaped," including a flat surface 64 and a curved surface 66, and the socket 52 has a corresponding geometric shape that is sized to receive the upper end 56 of the drive stem 48. When the drive stem 48 is secured to the cutting assembly 18 as shown in FIG. 2, the keyed upper end 56 of the stem 48 is received in the socket 52 of the central shaft 50. As such, rotation of the output shaft 42 of the motor 14 causes rotation of the cutting assembly 18.

It should be appreciated that in other embodiments the arrangement of the socket and keyed end may be reversed, with the keyed end being formed on the central shaft 50 and the socket being defined in the drive stem 48. It should also be appreciated that in other embodiments other methods of attachment may be used to secure the drive stem to the cutting assembly. For example, a pair of tabs may extend from the upper end of the drive stem 48, and those tabs may be received in a corresponding socket defined in the central shaft 50.

Referring now to FIG. 2, the cutting assembly 18 also includes a mounting arm 62 that extends outwardly from the central shaft 50, and the cutting blade 34 is secured to the upper surface of the mounting arm 62. In the illustrative embodiment, the central shaft 50 and the mounting arm 62 are formed from a metallic material as a single monolithic component. It should be appreciated that in other embodiments the shaft 50 and the arm 62 may be formed as separate components, which are then joined together during final assembly by an adhesive or other suitable fastener. A number of fasteners (not shown) rigidly secure the cutting blade 34 to the mounting arm 62. It will be appreciated that the fasteners may take the form of screws, T-stakes, pins, posts, or other structures capable of securing the cutting blade 34 to the arm 62.

The rotating disk 36 includes a central hub 70, a planar body 72 extending radially outward from the central hub 70, and a rim 74 extending upwardly from the outer perimeter of the planar body 72. The rotating disk 36 has a diameter that is slightly less than the inner diameter of the bowl 22 such that the rim 74 is positioned adjacent to, but is slightly spaced apart from, the inner wall of the bowl to permit rotation of the disk 36 within the bowl 22. In the illustrative embodiment, the planar body 72 and the rim 74 are embodied as a monolithic structure (e.g., a single molded or cast part). However, it should be appreciated that all of the components of the rotating disk 36 (e.g., hub 70, body 72, and rim 74) may be integrated into a single monolithic structure or may be formed as separate components secured to one another by an adhesive or other suitable fastener. It should also be appreciated that in other embodiments the one or more structures of the rotating disk may be modified or omitted. For example, in some embodiments, the rim may be omitted or reduced in height.

As shown in FIG. 2, the hub 70 of the rotating disk 36 has a lower end 76 positioned below the planar body 72 and an upper end 78 positioned above the planar body 72. An opening 80 is defined in the lower end 76 of the hub 70, and an inner wall 82 extends inwardly from the opening 80 to define an aperture 84 in the hub 70. A pocket 86 is defined in the hub 70 between the lower end 76 and the upper end 78, and the pocket 86 opens into the aperture 84.

The rotating disk 36 and the cutting blade 34 are coupled together via the central shaft 50, which is positioned in the aperture 84 of the hub 70, and the mounting arm 62, which extends outwardly through the pocket 86 of the hub 70 and is positioned in an oblong opening 88 formed in the rotating disk 36. The central shaft 50, the mounting arm 62, and the hub 70 are keyed such that the cutting blade 34 is torsionally secured to the rotating disk 36. In that way, the blade 34 and disk 36 may be driven together by the motor 14. It should be appreciated that in other embodiments the cutting blade 34 and the rotating disk 36 may be dissembled for cleaning, replacement, or repair.

In the illustrative embodiment, the rotating disk 36 of the cutting assembly 18 is configured to slide vertically relative to the blade 34 to adjust the cutting thickness of the cutting assembly 18, as indicated by arrow 90 in FIG. 2. The cutting assembly 18 has a biasing element that is configured to maintain the rotating disk 36 in a predetermined cutting position relative to the blade 34. The biasing element, such as, for example, spring 92, is positioned between a flange 94 that extends outwardly from the lower end 54 of the central shaft 50 and a rim 96 defined by the inner wall 82 of the hub 70 of the rotating disk 36. In the illustrative embodiment, the spring 92 biases the rotating disk 36 in a thin cutting position relative to the cutting blade 34 in which the cutting thickness is less than one millimeter. It should be appreciated that in other embodiments the biasing element may be arranged in the cutting assembly such that the rotating disk 36 is biased in another cutting position in which the cutting thickness is greater than five millimeters. It should be appreciated that in other embodiments of the cutting assembly the spring or other biasing element may be omitted.

Because the spring 92 maintains the rotating disk 36 in a cutting position in which the distance D defined between the cutting edge 38 of the cutting blade 34 and the upper surface 40 of the rotating disk 36 is relatively minimal, thinner food slices may be produced. In use, when a predetermined amount of force is applied to the upper surface 98 of the hub 70 in the direction indicated by arrow 100 (see FIG. 3), the rotating disk 36 is moved downward relative to the cutting blade 34. Because the cutting blade 34 is fixed to the drive stem 48 via the central shaft 50, the cutting blade 34 is maintained in its vertical position such that, as the rotating disk 36 moves downwardly, the distance D defined between the cutting edge 38 of the cutting blade 34 and the upper surface 40 of the rotating disk 36 is increased, thereby increasing the cutting thickness such that thicker food slices may be produced. When the predetermined amount of force is released from the upper surface 98 of the hub 70, the spring 92 urges the rotating disk 36 to move upward relative to the cutting blade 34 to the position shown in FIG. 2.

It should be appreciated that the cutting blade may be vertically fixed relative to the rotating disk via a spring, snap feature, or twist lock connecting the central shaft to the drive stem. The position of the central shaft may also be fixed between, for example, the drive stem and a bearing surface formed on the lid.

As described above, the food processor 10 also includes a thickness adjustment assembly 106 of the food processor 10. The adjustment assembly 106 is operable to vary the cutting thickness of the food processor 10 while the cutting assembly 18 is driven by the motor 14, thereby creating thicker or thinner pieces of food items during a cutting operation. The adjustment assembly 106 includes an actuation device 108 that is configured to move the rotating disk 36 relative to the cutting blade 34 and a user-operated control device 110 that is located outside of the processing chamber 28 that is configured to operate the actuation device 108. What is meant herein by the term "outside" as it relates to the location of the user-operated control device relative to the bowl or the processing chamber is that the structure of the control device contacted by the user to operate the device is positioned external to the bowl and lid so that it may be operated by the user while the lid is secured to the bowl, thereby allowing the cutting thickness of the food processor to be adjusted while the cutting assembly 18 is driven by the motor 14.

The actuation device 108 of the adjustment assembly 106 includes an actuator 112 that is attached the lid 30. In the illustrative embodiment, the lid 30 includes a shell 114 and the feed tube 32, extends upwardly from an outer surface 118 of the shell 114. As shown in FIG. 2, a detachable central cap 116 is secured to the outer surface 118 of the shell 114, and the actuator 112 includes an actuator motor 120 that is positioned in the central cap 116. The central cap 116 includes a snap-fit (not shown) that permits the central cap 116 (and hence motor 120) to be attached and detached from the shell 114. It should be appreciated that in other embodiments the central cap 116 may be secured to the shell 114 using fasteners, latches, posts, or tabs. When the lid 30 and the central cap 116 are assembled with the bowl 22 and the base 12, the actuator motor 120 is electrically coupled to the electronic controller 16.

The shell 114 of the lid 30 also has an outer rim 122 configured to be secured to the upper rim 24 of the bowl 22, and the cap 116 includes a sleeve 124 that extends into the chamber 28, as shown in FIG. 2. The sleeve 124 has a lower surface 130, and an inner wall 132 extends upwardly from the lower surface 130 to define a passageway 128 through the sleeve 124. The actuator 112 of the adjustment assembly 106 includes an output shaft 140 that is positioned in the passageway 134, and the output shaft 140 is configured to be rotated by the actuator motor 120.

The actuator 112 also includes a rod 142 that has an outer surface 144 keyed to substantially match the configuration of the passageway 134 of the sleeve 124. In the illustrative embodiment, the outer surface 144 of the rod 142 includes a number of flat sections and curved sections, and the inner wall 132 of the sleeve 124 and the cap 116 define a corresponding geometric shape that receives the rod 142. In that way, rotation of the rod 142 is prevented by the sleeve 124.

The rod 142 of the actuator 112 is also moveably coupled to the output shaft 140. As shown in FIG. 2, the output shaft 140 is externally-threaded, with a plurality of external threads 152 formed thereon. The rod 142 has an upper opening 154 defined therein and an inner wall 156 that extends inwardly from the opening 154. The rod 142 is internally-threaded, with a plurality of internal threads (not shown) formed thereon that correspond to the external threads 152 of the output shaft 140. As shown in FIG. 2, the internal threads of the rod 142 threadingly engage the external threads 152 of the output shaft 140. As a result, when the output shaft 140 is rotated by the actuator motor 120, the rod 142 is moved upwardly or downwardly along the output shaft 140. For example, clockwise rotation of the output shaft 140 may cause downward movement of the rod 142, while counterclockwise rotation of the output shaft 140 may cause upward movement of the rod 142.

As shown in FIG. 2, a lower end 160 of the actuator 112 is advanced into contact with the upper surface 98 of the hub 70 of the rotating disk 36 when the lid 30 is secured to the bowl 22. The lower end 160 of the actuator 112 is configured to be rotatively coupled to the rotating disk 36 such that the actuator 112 does not rotate with the cutting assembly 18 as the cutting assembly 18 is driven by the motor 14. In the illustrative embodiment, the actuator 112 has a bearing 162 attached to the rod 142. The bearing 162 is illustratively embodied as a thrust bearing that permits relative axial motion between the actuator 112 and the rotating disk 36 while being loaded axially between the rod 142 and the rotating disk 36. It should be appreciated that in other embodiments the actuator may be configured to be rotatively coupled to the rotating disk 36 in other ways, such as, for example, via a roller cam, a slip joint, or other means. The rod 142 may also include a low friction surface that permits relative axial motion between the actuator 112 and the rotating disk 36 while being loaded axially between the rod 142 and the rotating disk 36. It should also be appreciated that in other embodiments the bearing may be secured to the rotating disk rather than the rod.

The food processor 10 also includes a sensor 170 positioned in the base 12 and the bowl 22. The sensor 170 is a contact sensor that provides an indication of the presence of the lid 30 on the bowl 22. In the illustrative embodiment, the sensor 170 is operable to detect the lid 30 when the lid 30 is positioned on the bowl 22 and generate an electrical output signal indicative of the presence of the lid 30. The sensor 170 is electrically coupled to the electronic controller 16, which is operable to receive the electrical output signal. It will be appreciated that in other embodiments the sensor 170 may be any type of reed switch, curtain switch, plum switch, pressure switch, or any other type of electrical or mechanical switch operable to detect the presence of the lid 30 on the bowl 22.

As described above, the food processor 10 also includes an electronic controller 16 positioned in the base 12. The electronic controller 16 is, in essence, the master computer responsible for interpreting electrical signals sent by sensors associated with the food processor 10 and for activating or energizing electronically-controlled components associated with the food processor 10. For example, the electronic controller 16 is configured to control operation of the various components of the food processor 10, including the motor 14 and the actuator motor 120. The electronic controller 16 also monitors various signals from the controls 20, the sensor 170, etc. The electronic controller 16 also determines when various operations of the food processor 10 should be performed. For example, the electronic controller 16 determines whether to energize the motors 14, 120 based on the presence of the lid 30 and the state of the controls 20.

To do so, the electronic controller 16 includes a number of electronic components commonly associated with electronic units utilized in the control of electromechanical systems. For example, the electronic controller 16 includes, amongst other components customarily included in such devices, a processor such as a microprocessor 180 and a memory device 182 such as a programmable read-only memory device ("PROM") including erasable PROM's (EPROM's or EEPROM's). The memory device 182 is provided to store, amongst other things, instructions in the form of, for example, a software routine (or routines) which, when executed by the microprocessor 180, allows the electronic controller 16 to control the operation of the food processor 10.

The electronic controller 16 also includes an analog interface circuit 184. The analog interface circuit 184 converts the output signals from various sensors (e.g., sensor 170) into signals which are suitable for presentation to an input of the microprocessor 180. In particular, the analog interface circuit 184, by use of an analog-to-digital (A/D) converter (not shown) or the like, converts the analog signals generated by the sensors into digital signals for use by the microprocessor 180. It should be appreciated that the A/D converter may be embodied as a discrete device or number of devices, or may be integrated into the microprocessor 180. It should also be appreciated that if any one or more of the sensors associated with the food processor 10 generate a digital output signal, the analog interface circuit 184 may be bypassed.

Similarly, the analog interface circuit 184 converts signals from the microprocessor 180 into output signals which are suitable for presentation to the electrically-controlled components associated with the food processor 10 (e.g., the actuator motor 120). In particular, the analog interface circuit 184, by use of a digital-to-analog (D/A) converter (not shown) or the like, converts the digital signals generated by the microprocessor 180 into analog signals for use by the electronically-controlled components associated with the food processor 10. It should be appreciated that, similar to the A/D converter described above, the D/A converter may be embodied as a discrete device or number of devices, or may be integrated into the microprocessor 180. It should also be appreciated that if any one or more of the electronically-controlled components associated with the food processor 10 operate on a digital input signal, the analog interface circuit 184 may be bypassed.

Thus, the electronic controller 16 may control the operation of the food processor 10 in accordance with user-operated controls 20. In particular, the electronic controller 16 executes a routine including, amongst other things, a control scheme in which the electronic controller 16 monitors the outputs of the sensors associated with the food processor 10 to control the inputs to the electronically-controlled components associated therewith. To do so, the electronic controller 16 communicates with the sensors associated with the food processor 10 to determine, among other things, the presence of the lid 30. Armed with this data, the electronic controller 16 performs numerous calculations, either continuously or intermittently, including looking up values in preprogrammed tables, in order to execute algorithms to perform such functions as determining when to energize the motor 14 to rotate the cutting assembly 18, when to energize the actuator motor 120 to change the cutting thickness of the cutting assembly 18, when to de-energize one or both of the motors 14, 120, and so on.

In use, the lid 30 is secured to the bowl 22 as shown in FIG. 2, and a user operates one of the control buttons 20 to select a rotational speed for the cutting assembly 18. The electronic controller 16 receives the electronic signal from the control button 20 and energizes the motor 14 to rotate the drive stem 48. Because the cutting assembly 18 is secured to the drive stem 48 via the central shaft 50, the motor 14 causes the cutting assembly 18 to rotate at the selected rotational speed. While the motor 14 is energized, the user may advance food items into the processing chamber 28 through the feed tube 32 to be cut by the spinning cutting assembly 18. As shown in FIG. 2, the cutting assembly 18 is initially positioned at a cutting position in which relatively thin food items are produced. If the lid 30 is removed from the bowl 22 during the cutting operation, the sensor 170 generates an electronic signal. The electronic controller 16 receives the electronic signal and de-energizes the drive motor 14.

In the illustrative embodiment, the user may press another control button 190 to operate the actuator 112 if the user desires to increase the cutting thickness during the cutting operation. To do so, the user presses downward on the control button 190 to generate an electronic signal. The electronic controller 16 receives the electronic signal from the control button 190 and energizes the actuator motor 120 to rotate the output shaft 140 in the direction indicated by arrow 192. As the output shaft 140 is rotated, the rod 142 is advanced downward. As shown in FIG. 2, the bearing 162 of the actuator 112 engages the upper surface 98 of the hub 70 of the rotating disk 36. While the bearing 162 isolates the rod 142 from the rotation of the cutting assembly 18, the actuator 112 pushes downward on the rotating disk 36 to move the rotating disk 36 relative to the cutting blade 34. As a result, the distance D defined between the cutting edge 38 of the cutting blade 34 and the upper surface 40 of the rotating disk 36 increases and thereby increases the thickness of food items being processed by the food processor 10. In that way, the user may adjust the cutting thickness while the cutting assembly 18 is driven by the motor 14 without interfering with the cutting operation.

Figure 3:
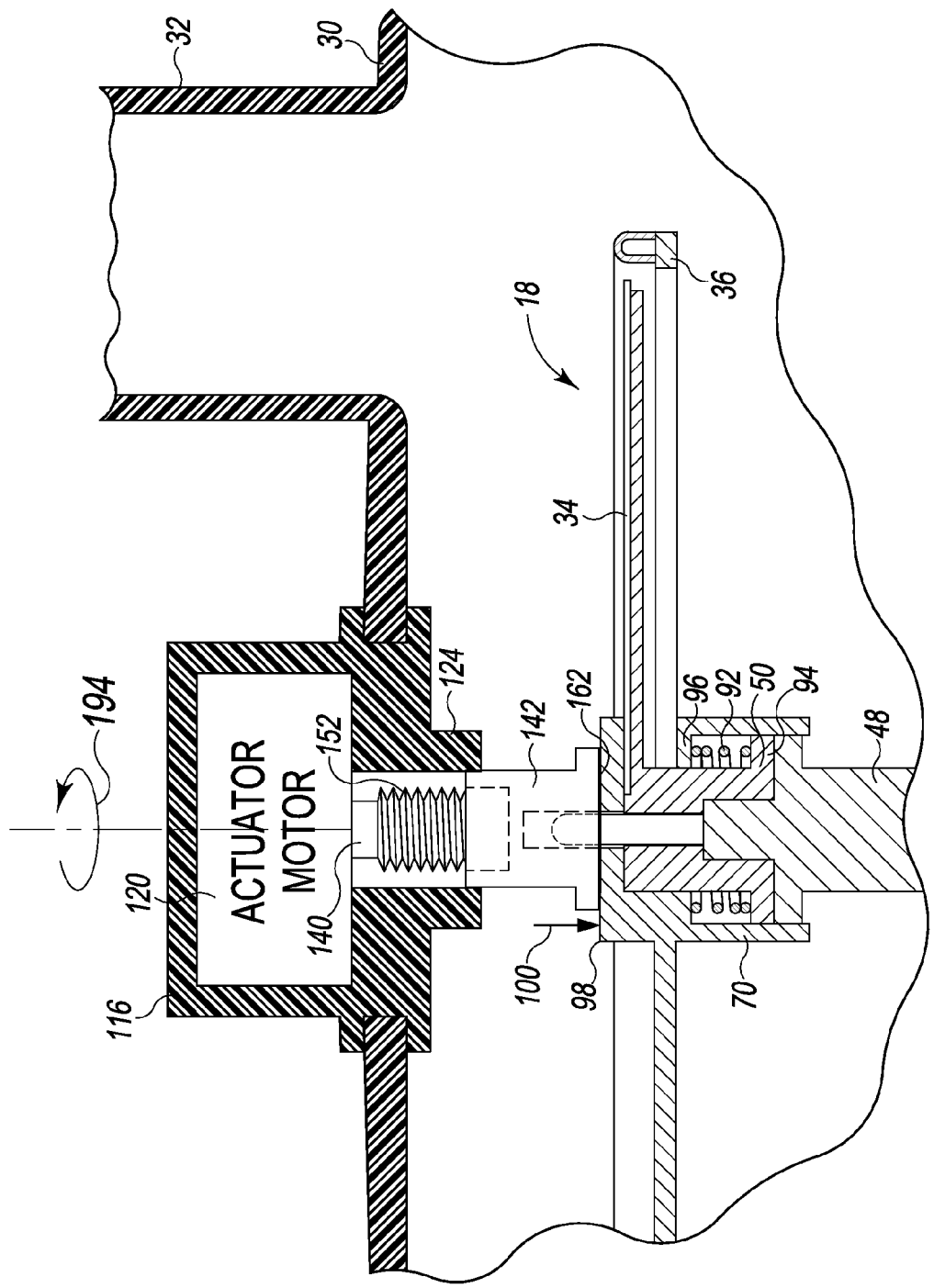
FIG. 3 is a view similar to FIG. 2 showing the cutting assembly in another cutting position.

The user may continue to operate the control button 190 to move the rotating disk 36 to its maximum displacement relative to the cutting blade 34, as shown in FIG. 3. In that position, the relatively thick food items are produced. If the user desires to decrease the cutting thickness during the cutting operation, the user presses upward on the control button 190 to generate an electronic signal. The electronic controller 16 receives the electronic signal from the control button 190 and energizes the actuator motor 120 to rotate the output shaft 140 in the direction indicated in FIG. 3 by arrow 194. The rod 142 of the actuator 112 is advanced upward as the output shaft 140 is rotated, and the spring 92 urges the rotating disk 36 to move upward relative to the cutting blade 34. As a result, the distance D defined between the cutting edge 38 and the upper surface 40 of the rotating disk 36 decreases, thereby decreasing the thickness of food items being processed by the food processor 10.

It should be appreciated that the food processor 10 may have one or more predetermined cutting positions stored in the memory device 182 such that when the user operates, for example, the control button 190, the rotating disk 36 is advanced to a predetermined position relative to the cutting blade 34. It should also be appreciated that the food processor 10 may include a number of control buttons 20 that correspond to a number of different cutting positions for the cutting assembly 18. In such embodiments, the user may operate a control button corresponding to the desired cutting position and the food processor 10 will respond by moving the cutting assembly 18 to the desired cutting position.

In other embodiments, the memory device 182 of the food processor 10 may have stored therein a number of predetermined cutting positions corresponding to a number of predetermined rotational or cutting speeds of the cutting assembly 18. In such embodiments, when the user operates a control button 20 corresponding to a predetermined rotational speed, the electronic controller 16 responds by energizing the drive motor 14 to spin the cutting assembly 18 at the selected rotational speed and energizing the actuator motor 120 to position the cutting assembly 18 at a predetermined cutting position corresponding to the selected rotational speed.

It should be appreciated that in other embodiments the actuator 112 may take other forms, such as, for example, a sliding ramp or ratching mechanism that is electronically-operated by the electronic controller. Additionally, it should be appreciated that in other embodiments the one or more of the control buttons may be replaced with sliding or pivoting levers, rotating knobs, and other interfaces that generate electronic signals for receipt by the electronic controller. In other embodiments, the food processor may also include a receiver or transceiver configured to receive control signals from a remote control device and transmit those signals to the electronic controller.

It should also be appreciated that the actuator motor of the actuation device 108 may be positioned in the base 12. In such embodiments, a separate drive shaft may be used to transfer motive force from the motor to the actuator 112. The actuation device 108 may also include a transmission system including, for example, a gear assembly to transfer motive force from the motor to the actuator 112.

Figure 4:
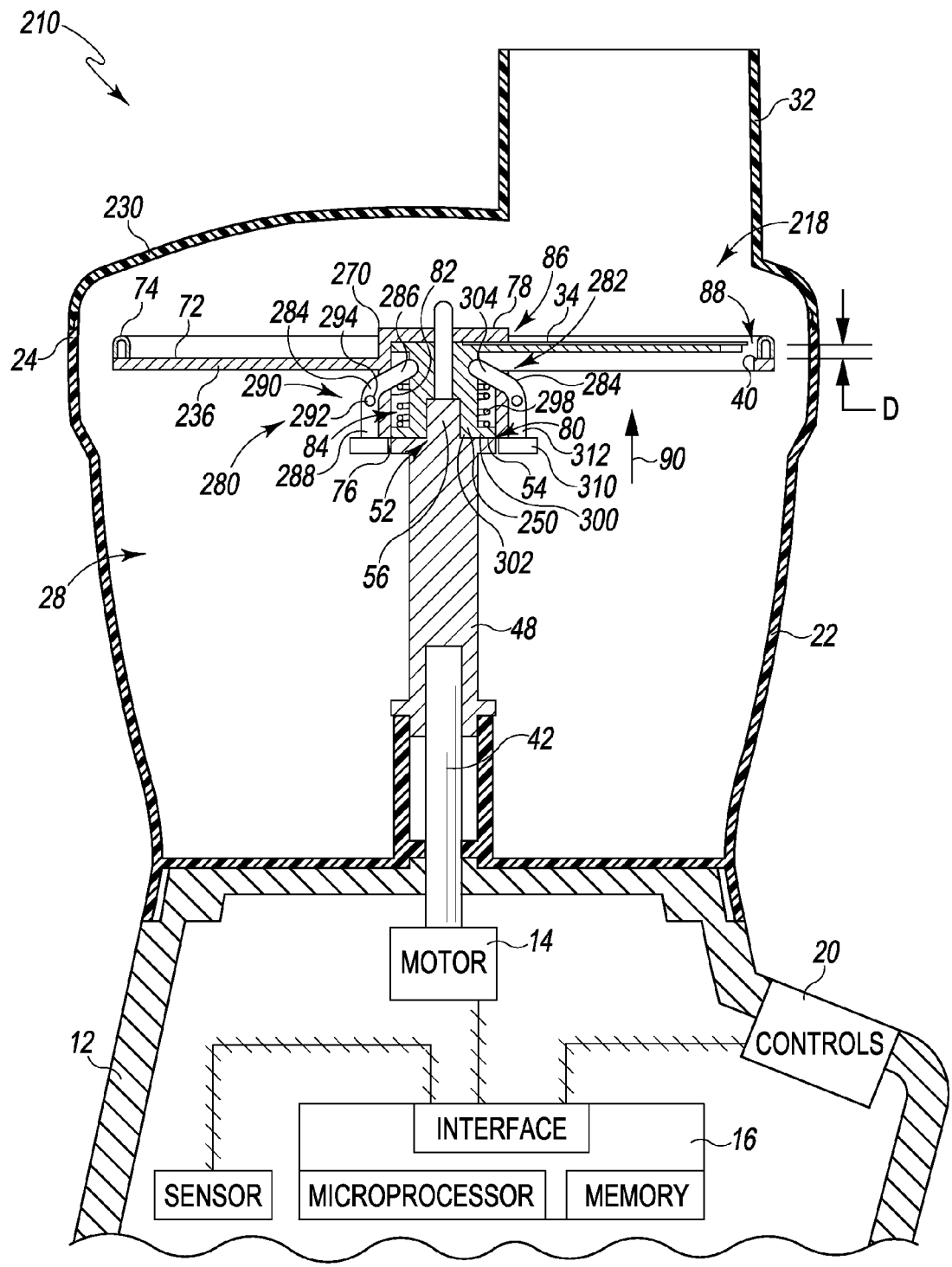
FIG. 4 is a partial cross-sectional side elevation view of another embodiment of a food processor showing a cutting assembly in one cutting position.
Figure 5:
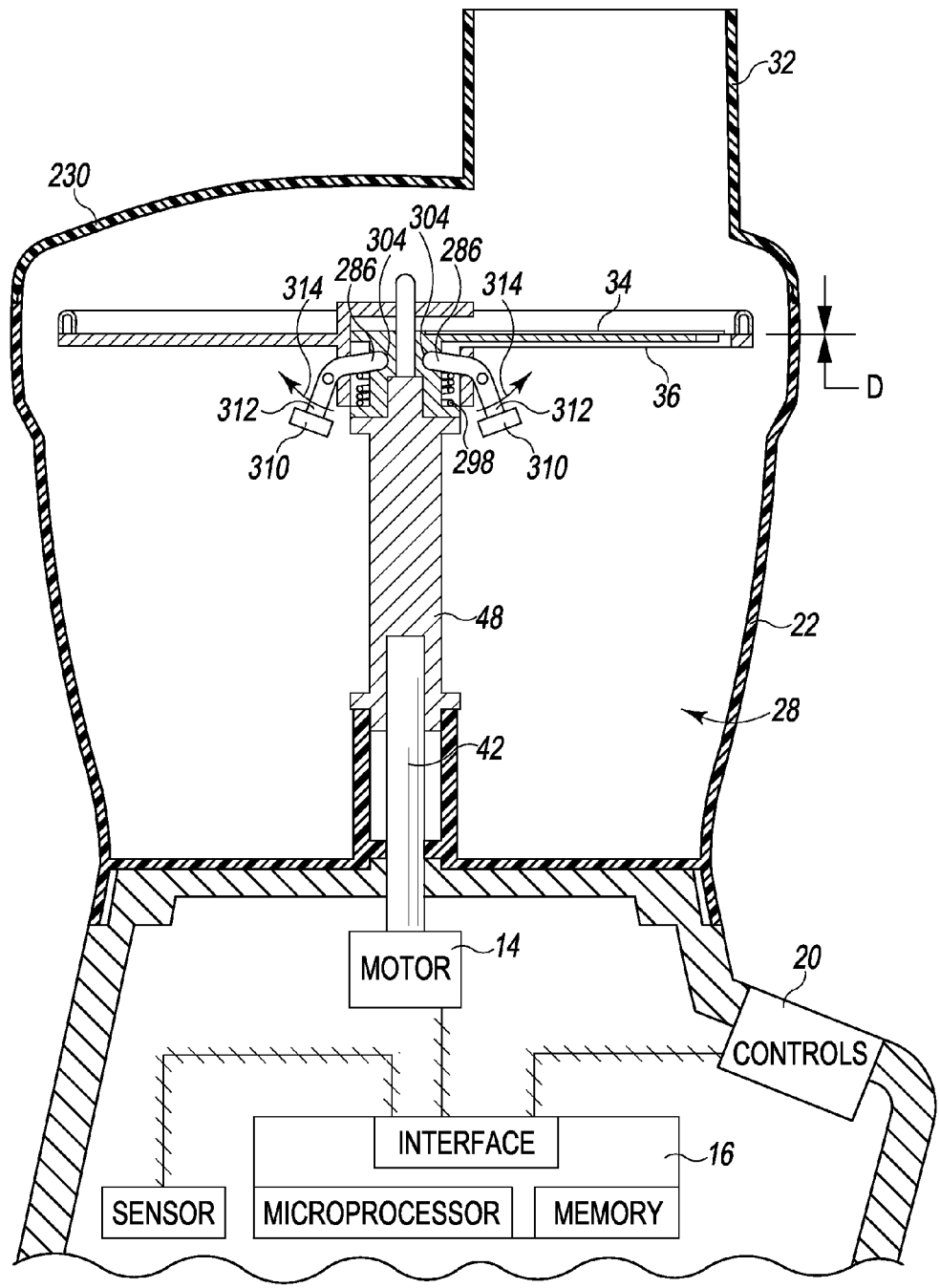
FIG. 5 is a view similar to FIG. 4 showing the cutting assembly in another cutting position.

Referring now to FIGS. 4 and 5, another embodiment of a food processor (hereinafter food processor 210) is shown. Some features of the embodiments illustrated in FIGS. 4 and 5 are substantially similar to those discussed above in reference to the embodiment of FIGS. 1-3. Such features are designated in FIGS. 4 and 5 with the same reference numbers as those used in FIGS. 1-3.

Referring to FIG. 4, the food processor 210 has a base 12 that houses a drive motor 14 and an electronic control unit (ECU) or "electronic controller" 16 electrically coupled to the motor 14. Under the control of the electronic controller 16, the motor 14 drives a cutting assembly 218 to cut food items such as cheeses, meats, fruits, and vegetables, as described in greater detail below. As described in greater detail below, the motor 14 is operable to drive the cutting assembly 18 at a number of different rotational speeds.

The base 12 also includes a number of control buttons 20 electrically coupled to the electronic controller 16. A user operates the control buttons 20 to control the operation of the motor 14 and hence the food processor 210. For example, one of the controls 20 may be operable to turn the motor 14 on and off while another control 20 may change the motor's speed. Each of the control buttons 20 is coupled to a control switch (not shown) operable to generate an electrical output signal when the user presses the corresponding button 20.

A removable receptacle or bowl 22 is secured to the base 12. The bowl's handle facilitates placement of the bowl 22 on the base 12. The bowl 22 has an upper rim 24 and an inner wall 26 that extends downwardly from the upper rim 24 to define a processing chamber 28 where food items may be processed by the cutting assembly 218.

The food processor 210 also includes a removable lid 230 that is configured to be secured to the rim 24 of the bowl 22.

In that way, the removable lid 230 encloses the processing chamber 28. The lid 230 has a feed tube 32 formed thereon through which food items such as fruits and vegetables may be inserted into the bowl 22 to be processed by the food processor 210.

As shown in FIG. 4, the cutting assembly 218 includes a cutting blade 34 and a rotating disk 236. A vertical distance, D, between the cutting edge 38 of the cutting blade 34 and the upper surface 40 of the rotating disk 236 defines a cutting thickness of food items processed by the cutting assembly 218. Similar to the embodiment of FIGS. 1-3, the rotating disk 236 of the cutting assembly 218 is configured to slide vertically relative to the blade 34 to adjust the cutting thickness of the cutting assembly 218, as indicated in FIG. 4 by arrow 90.

The cutting assembly 218 also includes a central shaft 250 that is configured to be coupled to a removable drive stem 48. Like the central shaft 50 described above in regard to FIGS. 1-3, the central shaft 250 has a plurality of inner walls that define a socket 52 in a lower end 54 thereof, and the drive stem 48 has an upper end 56 that is keyed to substantially match the configuration of the socket 52. As such, rotation of the output shaft 42 of the drive motor 14 causes rotation of the cutting assembly 218.

The rotating disk 236 includes a central hub 270 that receives the central shaft 250, a planar body 72 extending radially outward from the central hub 270, and a rim 74 extending upwardly from the outer perimeter of the planar body 72. As shown in FIG. 3, the hub 270 of the rotating disk 236 has a lower end 76 positioned below the planar body 72 and an upper end 78 positioned above the planar body 72. An opening 80 is defined in the lower end 76 of the hub 70, and an inner wall 82 extends inwardly from the opening 80 to define an aperture 84 in the hub 270. A pocket 86 is defined in the hub 270 between the lower end 76 and the upper end 78, and the pocket 86 opens into the aperture 84.

The central shaft 250 is positioned in the aperture 84 of the hub 70. The cutting assembly 218 also includes a mounting arm 62 that extends outwardly from the central shaft 250 through the pocket 86 of the hub 70. The cutting blade 34 is secured to the upper surface of the mounting arm 62, and the mounting arm is positioned in an opening 88 formed in the planar body 72 of the rotating disk 236. The central shaft 250, the mounting arm 62, and the hub 270 are keyed such that the cutting blade 34 is torsionally secured to the rotating disk 236. In that way, the blade 34 and disk 236 may be driven together by the motor 14. It should be appreciated that in other embodiments the cutting blade 34 and the rotating disk 236 may be dissembled for cleaning, replacement, or repair.

As shown in FIG. 4, the food processor 210 includes a thickness adjustment assembly 280 that is operable to vary the cutting thickness of the food processor 210 while the cutting assembly 218 is driven by the motor 14. In that way, thicker or thinner pieces of food items may be created during a cutting operation. The adjustment assembly 280 includes a centrifugal actuator 282 that is secured to the cutting assembly 218. As described in greater detail below, the centrifugal actuator 282 is configured to lower and raise the rotating disk 236 relative to the cutting blade 34 based on the rotational or cutting speed of the cutting assembly 218.

In the illustrative embodiment, the centrifugal actuator 282 includes a pair of lever arms 284. Each lever arm 284 has an arm section 286 extending at an obtuse angle relative to an arm section 288. Each lever arm 284 is pivotally coupled to the central hub 270 of the rotating disk 236 at a joint 290. The joint 290 includes a cylindrical pin 292 extending through a hole 294 defined in the arm section 288 of the lever arm 284.

The cylindrical pin 292 is received in a pair of holes (not shown) defined in the hub 270 of the rotating disk 236. The lever arms 284 are positioned in vertically-extending slots (not) defined in the hub 270 and the shaft 250.

The cutting assembly 218 has a biasing element that is configured to maintain the rotating disk 236 in a predetermined cutting position relative to the blade 34. The biasing element, such as, for example, spring 298, is positioned between a flange 300 extending outwardly from a lower end 302 of the central shaft 250 and an upper end 304 of the arm section 286. In the illustrative embodiment, the spring 298 biases the rotating disk 236 in a thick cutting position relative to the cutting blade 34. It should be appreciated that in other embodiments the spring or other biasing element may bias the rotating disk in a thin cutting position relative to the cutting blade 34.

Each lever arm 284 has a mass 310 secured to a lower end 312 of the arm section 286. The magnitude of the mass 310 is selected such that the mass 310 causes the lever arm 284 to pivot upward in the direction indicated by arrows 314 as the rotational speed of the cutting assembly 218 is increased. As the lever arm 284 is pivoted upward, the bias exerted by the spring 298 is overcome and the rotating disk 236 is moved upward relative to the cutting blade 34 such that the distance D between the cutting edge 38 of the cutting blade 34 and the upper surface 40 of the rotating disk 236 is decreased, as shown in FIG. 5.

As shown in FIGS. 4 and 5, the lever arm 284 is configured to pivot by predetermined amounts that correspond to predetermined rotational or cutting speeds of the cutting assembly 218. As a result, the rotating disk 236 is positioned in predetermined cutting positions based on the rotational speed of the cutting assembly 218 such that food items having a predetermined cutting thickness are produced. In the illustrative embodiment, the distance D between the cutting edge 38 of the cutting blade 34 and the upper surface 40 of the rotating disk 236 is approximately five to six millimeters when the rotational speed of the cutting assembly 218 is between approximately 500 to 700 revolutions per minute (RPM), thereby producing cut food items having a thickness of approximately five to six millimeters. Additionally, in the illustrative embodiment, the distance D between the cutting edge 38 of the cutting blade 34 and the upper surface 40 of the rotating disk 236 is approximately two millimeters when the rotational speed of the cutting assembly 218 is greater than or equal to 1750 RPM. In that way, thicker food items are produced at lower rotational speeds while thinner food items are produced at higher rotational speeds.

In other embodiments, the adjustment assembly 280 may be configured to position the cutting assembly 218 at other predetermined cutting positions. For example, the distance D between the cutting edge 38 of the cutting blade 34 and the upper surface 40 of the rotating disk 236 may be approximately four millimeters when the rotational speed of the cutting assembly 218 is approximately 1000 RPM. The distance D between the cutting edge 38 of the cutting blade 34 and the upper surface 40 of the rotating disk 236 may also be approximately three millimeters when the rotational speed of the cutting assembly 218 is approximately 1500 RPM.

It should be appreciated that in other embodiments the cutting assembly 218 may be configured such that thinner food items are produced at higher rotational speeds while thicker food items are produced at lower rotational speeds. In such embodiments, the cutting blade or the rotating disk may be biased in a thinner cutting position and the centrifugal actuator may be configured to move the cutting blade or the rotating disk to a thicker cutting position as the rotational speed is increased.

It should also be appreciated that in other embodiments the centrifugal actuator 282 may take other forms. For example, the actuator 282 may be embodied as an inertia screw drive, a cam and spring system, or other inertia device configured to lower and raise the rotating disk relative to the cutting blade. Additionally, it should also be appreciated that in other embodiments the actuator may be configured to lower the rotating disk 236 relative to the cutting blade 34 as the rotational speed is increased.

In use, the lid 30 is secured to the bowl 22 as shown in FIG. 4, and a user may operate one of the control buttons 20 to select a low rotational speed for the cutting assembly 218. The electronic controller 16 receives the electronic signal from the control button 20 and energizes the motor 14 to rotate the drive stem 48. Because the cutting assembly 218 is secured to the drive stem 48 via the central shaft 50, the motor 14 causes the cutting assembly 218 to rotate at the selected rotational speed. While the motor 14 is energized, the user may advance food items into the processing chamber 28 through the feed tube 32 to be cut by the spinning cutting assembly 218.

As shown in FIG. 4, the centrifugal actuator 282 positions the cutting assembly 218 at a cutting position in which relatively thick food items are produced at low rotational speeds. If the user desires to decrease the cutting thickness during the cutting operation, the user may press another control button 20 corresponding to another, increased rotational speed. The control button 20 generates an electronic signal and the electronic controller 16 receives and processes the signal before energizing the motor 14 to rotate the cutting assembly 218 at the increased rotational speed. As the rotational speed increases, the masses 310 are drawn outward by centrifugal force, thereby causing the lower ends 312 of lever arms 284 to pivot upward and the upper ends 304 of the lever arms 284 to pivot downward to compress the spring 298. As the lower ends 312 of lever arms 284 pivot upward, the rotating disk 236 is moved upward relative to the cutting blade 34, as shown in FIG. 5. As a result, the distance D defined between the cutting edge 38 of the cutting blade 34 and the upper surface 40 of the rotating disk 236 decreases and thereby decreases the thickness of food items being processed by the food processor 10. In that way, the user may adjust the cutting thickness while the cutting assembly 218 is driven by the motor 14.

If the user desires to increase the cutting thickness during the cutting operation, the user presses another control button 20 to generate an electronic signal. The electronic controller 16 receives the electronic signal from the control button 20 and energizes the motor 14 at a decreased rotational speed. As the rotational speed decreases, the masses 310 are drawn inward, thereby causing the lever arms 284 to pivot downward. The spring 298 urges the rotating disk 236 to move downward relative to the cutting blade 34 as the lever arms 284 pivot downward. As a result, the distance D defined between the cutting edge 38 and the upper surface 40 of the rotating disk 236 increases, thereby increasing the thickness of food items being processed by the food processor 10.

It should be appreciated that the control buttons of the food processors described above may include labels or other indicia to indicate the function of each button. For example, the control buttons may include indicia that inform the user of a rotational speed, a cutting thickness, a food type, or other information regarding the operation of the food processor. Additionally, it should also be appreciated that in other embodiments the rotating disk may be vertically fixed and the cutting blade may be configured to move relative to the rotating disk to change the cutting thickness.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

For example, while food processor 10 is herein illustrated as a conventional domestic food processor, the features and aspects disclosed herein can also be implemented in other types of food processing devices such as automatic food choppers, slicers, dicers, ice shavers and the like. Additionally, while the cutting assembly 18 was illustratively embodied as an adjustable slicing disk attachment, the concept of an adjustable cutting assembly 18 can also be implemented with other cutting attachments, such as, for example, a shedding disk, grate/shaving disk, julienne disk, and the like.

It should be further appreciated that the food processors described herein may include one or position markings that correspond to preset cutting positions for the cutting assembly. It should also be appreciated that each of the food processors may include a locking mechanism configured to inhibit movement of the thickness adjustment assembly and thereby maintain the cutting assembly at a particular cutting position.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A food processor comprising:
a base having a motor positioned therein,
a bowl removably coupled to the base, the bowl having a processing chamber defined therein,
a lid removably coupled to the bowl, the lid having a feed tube that opens into the processing chamber when the lid is secured to the bowl,
a cutting assembly positioned in the processing chamber and driven by the motor to cut food items advanced through the feed tube, the cutting assembly being positionable between a plurality of cutting positions to produce cut food items of varying thicknesses, and
an adjustment assembly including:
an electronically-controlled actuator coupled to the lid and operable to move the cutting assembly between the cutting positions, and
an electronic controller electrically coupled to the actuator, the controller comprising (i) a processor, and (ii) a memory device electrically coupled to the processor, the memory device having stored therein a plurality of instructions which, when executed by the processor, cause the processor to operate the actuator to move the cutting assembly between the plurality of cutting positions while the cutting assembly is driven by the motor.

2. The food processor of claim 1, wherein:
the motor positioned in the base is a first motor, and
the actuator includes (i) a body being configured to move upwardly and downwardly relative to the lid to move the cutting assembly between cutting positions, (ii) a second motor electrically coupled to the electronic controller, and (iii) an output shaft connecting the body to the second motor.

3. The food processor of claim 2, wherein the cutting assembly includes a cutting blade and a rotating disk coupled to the actuator, the rotating disk being upwardly and downwardly moveable relative to the cutting blade to produce food items of varying thicknesses.

4. The food processor of claim 3, wherein the actuator further includes a bearing positioned between the body and the rotating disk, the bearing being configured to permit the rotating disk to rotate relative to the body of the actuator.

5. The food processor of claim 3, wherein:
the cutting assembly further includes a spring positioned between the cutting blade and the rotating disk, the spring biasing the rotating disk in a first cutting position to produce a food item having a first thickness, and
movement of the body of the actuator in a first direction causes the rotating disk to move relative to the cutting blade from the first cutting position to a second cutting position to produce a food item having a second thickness different from the first thickness.

6. The food processor of claim 3, wherein:
the body of the actuator is internally-threaded,
the output shaft of the second motor is externally-threaded and is received in the body of the actuator, and
rotation of the output shaft in a first direction causes the body and the rotating disk to advance downward and rotation of the output shaft in a second direction causes the body and the rotating disk to move upward.

7. The food processor of claim 6, further comprising a removable cap coupled to the lid, the cap including a plurality of inner walls that define a socket sized to receive the body of the actuator, and the inner walls are configured to engage the body to prevent rotation of the body.

8. The food processor of claim 1, further comprising a sensor electrically coupled to the electronic controller, the sensor being operable to detect whether the lid coupled to the bowl and generate an electrical output signal indicative thereof,
wherein the memory device has stored therein a plurality of instructions which, when executed by the processor cause the processor to:
(i) communicate with the sensor to determine whether the lid coupled to the bowl, and
(ii) deenergize the motor when the lid is removed from the bowl.

9. The food processor of claim 1, wherein the memory device has stored therein a plurality of instructions which, when executed by the processor cause the processor to:
(i) energize the motor to drive the cutting assembly at a first rotational speed, and
(ii) operate the actuator move the cutting assembly to a first cutting position corresponding to the first rotational speed.

10. A food processor comprising:
a base,
a bowl removably coupled to the base, the bowl having a processing chamber defined therein,
a lid removably coupled to the bowl, the lid having a feed tube that opens into the processing chamber when the lid is secured to the bowl, a cutting assembly positioned in the processing chamber and configured to cut food items advanced through the feed tube, the cutting assembly being positionable between a plurality of cutting positions to produce cut food items of varying thicknesses, a motor positioned in the base, the motor being configured to rotate the cutting assembly at a plurality of rotational speeds, and an adjustment assembly configured to move the cutting assembly between the plurality of cutting positions based on the rotational speed of the cutting assembly.

11. The food processor of claim 10, wherein the cutting assembly includes a cutting blade and a rotating disk, the rotating disk being upwardly and downwardly moveable relative to the cutting blade to produce food items of varying thicknesses.

12. The food processor of claim 11, wherein:
the adjustment assembly includes (i) a lever arm that is pivotally coupled to the rotating disk, and (ii) a mass that is coupled to a lower end of the lever arm, and when the rotational speed is increased from a first rotational speed to a second rotational speed, the lower end of the lever arm is configured to pivot upward to move the rotating disk relative to the cutting blade.

13. The food processor of claim 12, wherein:
the cutting assembly further includes a spring biasing the lever arm in a first position such that when the cutting assembly is rotated at the first rotational speed, the lever arm is maintained in the first position and a first distance is defined between the cutting blade and the rotating disk, and when the cutting assembly is rotated at the second rotational speed, the lever arm is in a second position and a second distance is defined between the cutting blade and the rotating disk, the second distance being less than the first distance.

14. The food processor of claim 13, wherein the first rotational speed is in a range of 500 to 700 revolutions per minute.

15. The food processor of claim 14, wherein the first distance is in a range of 5 to 6 millimeters.

16. The food processor of claim 13, wherein the second rotational speed is greater than or equal to 1750 revolutions per minute.

17. The food processor of claim 16, wherein the second distance is approximately 2 millimeters.

18. The food processor of claim 12, wherein:
the cutting assembly further includes a spring biasing the lever arm in a first position such that when the cutting assembly is rotated at the first rotational speed, the lever arm is maintained in the first position and a first distance is defined between the cutting blade and the rotating disk, and when the cutting assembly is rotated at the second rotational speed, the lever arm is in a second position and a second distance is defined between the cutting blade and the rotating disk, the second distance being greater than the first distance.

19. The food processor of claim 10, wherein the adjustment assembly includes:
an electronically-controlled actuator operable to move the cutting assembly between the plurality of cutting positions, and an electronic controller electrically coupled to the actuator, the controller comprising (i) a processor, and (ii) a memory device electrically coupled to the processor, the memory device having stored therein a plurality of instructions which, when executed by the processor, cause the processor to operate the actuator to move the cutting assembly between the plurality of cutting positions based on the rotational speed of the cutting assembly.

20. A food processor comprising:
a base,
a bowl removably coupled to the base, the bowl having a processing chamber defined therein,
a lid removably coupled to the bowl, the lid having a feed tube that opens into the processing chamber when the lid is secured to the bowl,
a cutting assembly positioned in the processing chamber and configured to cut food items advanced through the feed tube, the cutting assembly including a cutting blade and a rotating disk, the rotating disk being upwardly and downwardly moveable relative to the cutting blade between a plurality of cutting positions to produce food items of varying thicknesses,
a motor positioned in the base, the motor being configured to rotate the cutting assembly at a plurality of rotational speeds, and
an adjustment assembly including a centrifugal actuator pivotally coupled to the rotating disk, the centrifugal actuator being configured to move the rotating disk between the plurality of cutting positions based on the rotational speed of the cutting assembly.

* * * * *